June 28, 1932.  G. KEGELMAN  1,864,832

COMBINED LEVEL AND TRANSIT

Filed Nov. 28, 1931

INVENTOR

George Kegelman

BY

Augustus B. Stoughton

ATTORNEY.

WITNESS:

Robt P Kitchel

Patented June 28, 1932

1,864,832

UNITED STATES PATENT OFFICE

GEORGE KEGELMAN, OF PHILADELPHIA, PENNSYLVANIA, ASSIGNOR TO HELLER & BRIGHTLY, INC., OF PHILADELPHIA, PENNSYLVANIA, A CORPORATION OF PENNSYLVANIA

COMBINED LEVEL AND TRANSIT

Application filed November 28, 1931. Serial No. 577,785.

The principal object of the present invention is to provide a combined transit and level which may be used in either capacity without detaching the telescope from the instrument. Another object of the invention is to provide such a combined instrument capable of adjustment in the field. Other objects of the invention will appear from the following description at the end of which the invention will be claimed.

Generally stated, the invention comprises a telescope having at its central part horizontal trunnions aligned with its major axis and having at the top or summit of the end parts external flats or pads disposed equidistant from said axis and from the center line of the trunnions, a frame provided with trunnion bearings and having space between and below the trunnions for the elevation and depression of the telescope, turnable clips provided on the frame and above the telescope and adapted to be turned clear of the telescope to permit of its elevation and depression, and adjusting screws or stops carried by the clips and adapted to cooperate with said flats or pads to positively position and hold the telescope level.

The invention also comprises the improvements to be presently described and finally claimed.

In the following description reference will be made to the accompanying drawing forming part hereof and in which Figure 1 is an elevation of parts of an instrument embodying features of the invention.

Figure 2:
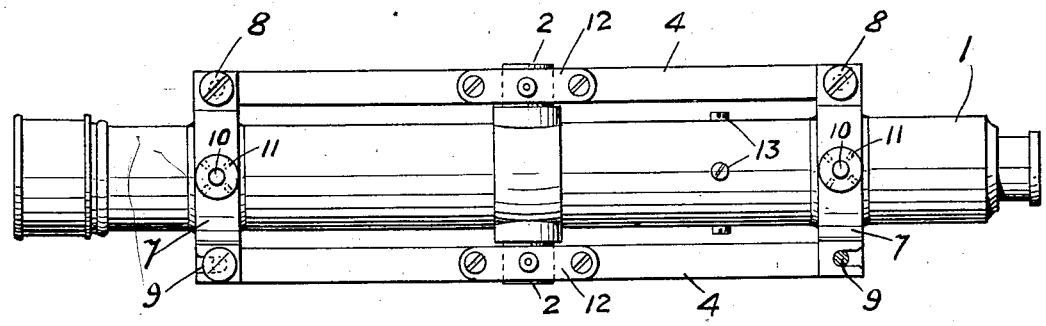
Fig. 2 is a top or plan view of the same.
Figure 1:
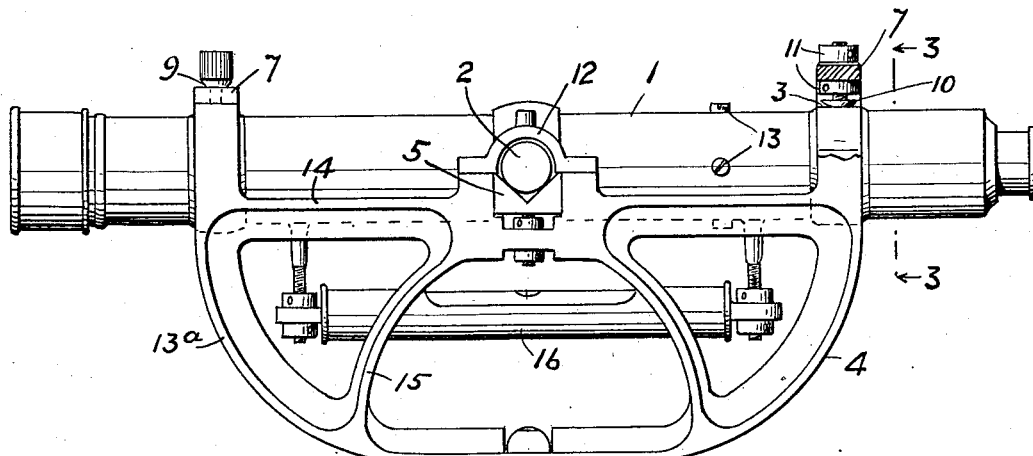
Figure 3:
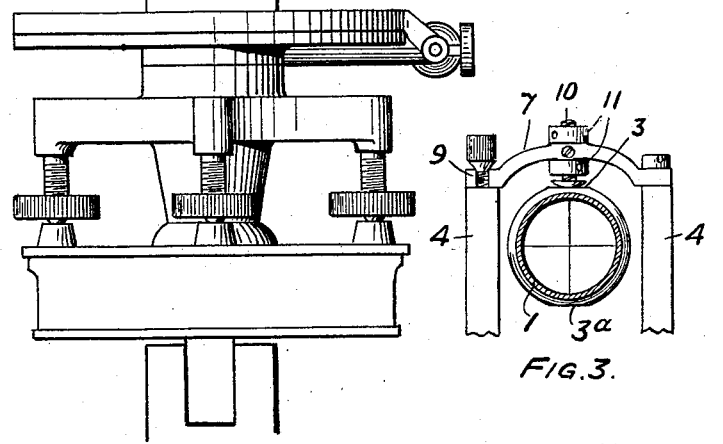
Fig. 3 is a sectional view taken on the line 3—3 of Fig. 1.

Referring to the drawing, 1 indicates a telescope having at its central part trunnions 2, aligned with its major axis and having at the top of the end parts an external flat bearing surface or pad 3. The flats 3 are equidistant from the major axis of the telescope 1, and from the center line of the trunnions 2. There is a frame shown to consist of two spaced standards 4, provided with bearings 5 for the trunnions. The space between the standards permits of the elevation and depression of the telescope 1. 7 represents clips above the telescope and they are turnably attached at one end to one standard as at 8 and detachably attached at the other end to the other standard, Fig. 3, by a set screw and notch connection 9. The clips are adapted to be turned clear of the telescope 1 to permit of its elevation and depression for use as a transit. 10 indicates adjusting screws or stops carried by the clips and they, or more accurately, their heads, cooperate with the flats 3 to position and hold the telescope level. 11 indicates lock nuts for the adjusting screws 10.

There are flats $3^a$ diametrically opposite the flats 3, and the trunnion caps 12 are removable to permit detachment of the telescope 1, and the turning thereof through 180° about its major axis for purposes of effecting adjustments, too well understood to require explanation or description.

The clips with the adjusting screws and lock nuts operate on one pad or flat 3 at each end of the telescope while mounted on its trunnions to level and hold it level in order to permit the instrument to be used as a level. The clips are opened or turned aside to permit the instrument to be used as a transit. To do this first open the clip at the object end of the telescope and then depress the eye end of the telescope 10°, or thereabouts, so that the clip at eye-piece end will avoid the web piece screw 13, and then open the clip at the eye piece end.

In converting the instrument from use as a transit to use as a level the procedure last described is reversed, and when the clips are turned over, the ends of the telescope, the adjusting screws 10, and flats 3 insure that the telescope is in level position.

The spaced standards 4 of the solid one piece frame comprise an arcuate member $13^a$, a chord member 14, and an archlike brace member 15, each of ribbed form in cross section. By this construction the frame is light, yet strong and rigid enough to enable the instrument to maintain its adjustments. The archlike braces 15 reinforce the trunnions and facilitate reading the telescope level 16.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. A combined transit and level comprising, in combination, a telescope having at its central part trunnions aligned with its major axis and having at the top of the end parts external flats disposed equidistant from said axis and from the center line of the trunnions, a frame provided with trunnion bearings and having space for the elevation and depression of the telescope, turnable clips provided on the frame and above the telescope and adapted to be turned clear of the telescope to permit of its elevation and depression, and adjusting screws carried by the clips and adapted to cooperate with said flats to positively position and hold the telescope level.

2. A combined transit and level as specified in claim 1 and in which the caps of the trunnion bearings are detachable and in which the flats are duplicated and are disposed diametrically opposite each other, for the purposes of adjustment of the instrument.

3. A combined transit and level as specified in claim 1, and in which the frame is in one piece and comprises an arcuate member and a chord member and an archlike brace member, each of ribbed form in cross section.

GEORGE KEGELMAN.